(12) United States Patent
Wang (10) Patent No.: US 12,096,288 B2
(45) Date of Patent: Sep. 17, 2024

(54) SWITCHING METHOD AND APPARATUS, AND COMMUNICATION DEVICE (71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 377 days.

(21) Appl. No.: 17/514,583

(22) Filed: Oct. 29, 2021

(65) Prior Publication Data
US 2022/0053392 A1 Feb. 17, 2022

Related U.S. Application Data (63) Continuation of application No. PCT/CN2019/086485, filed on May 10, 2019.

(51) Int. Cl.
*H04W 36/00* (2009.01)
*H04W 12/037* (2021.01)
(Continued)

(52) U.S. Cl.
CPC ..... *H04W 36/0077* (2013.01); *H04W 12/037* (2021.01); *H04W 12/108* (2021.01); *H04W 74/0833* (2013.01)

(58) Field of Classification Search
USPC .......................................................... 370/330
See application file for complete search history.

(56) References Cited

U.S. PATENT DOCUMENTS

2010/0062774 A1* 3/2010 Motegi ................. H04W 36/02
455/437
2010/0322151 A1* 12/2010 Racz ..................... H04W 28/06
370/328
(Continued)

FOREIGN PATENT DOCUMENTS

CN 106465435 A 2/2017
CN 107690154 A 2/2018
(Continued)

OTHER PUBLICATIONS

Chinese First Office Action with English Translation of CN Application 2019800958191 filed Aug. 4, 2023.
(Continued)

*Primary Examiner* — Gregory B Sefcheck
*Assistant Examiner* — Majid Esmaeilian
(74) *Attorney, Agent, or Firm* — Young Basile Hanlon & MacFarlane, P.C.

(57) ABSTRACT

Provided are a handover method and apparatus, and a communication device. The method includes: after a terminal determines that a handover failure occurs or when a handover timer times out, sending first information to a target secondary node, wherein the first information includes handover failure information and/or MCG failure information; and the first information is forwarded to a target master node by the target secondary node, and the target master node determines a new handover process, or, the first information is forwarded to the target master node by the target secondary node and then forwarded to an original master node by the target master node, and the original master node determines the new handover process.

20 Claims, 6 Drawing Sheets (51) Int. Cl.
  *H04W 12/108* (2021.01)
  *H04W 74/0833* (2024.01)

(56) References Cited

U.S. PATENT DOCUMENTS

| | | | | |
|---|---|---|---|---|
| 2013/0210422 A1* | 8/2013 | Pani | ............... | H04W 8/02 |
| | | | | 455/423 |
| 2015/0038145 A1* | 2/2015 | Nakata | ............... | H04W 36/0064 |
| | | | | 455/436 |
| 2015/0208283 A1* | 7/2015 | Yang | ............... | H04W 36/0069 |
| | | | | 370/331 |
| 2015/0341984 A1* | 11/2015 | Wang | ............... | H04W 92/20 |
| | | | | 370/329 |
| 2016/0029282 A1* | 1/2016 | Lee | ............... | H04W 36/0069 |
| | | | | 370/332 |
| 2016/0150455 A1* | 5/2016 | Suryavanshi | ......... | H04W 36/24 |
| | | | | 455/436 |
| 2018/0123863 A1 | 5/2018 | Sharma | | |
| 2018/0124648 A1* | 5/2018 | Park | ............... | H04W 36/22 |
| 2018/0124656 A1* | 5/2018 | Park | ............... | H04W 36/0072 |
| 2019/0215756 A1* | 7/2019 | Park | ............... | H04W 76/19 |
| 2019/0253949 A1* | 8/2019 | Park | ............... | H04W 36/0077 |
| 2019/0261234 A1* | 8/2019 | Park | ............. | H04W 36/008355 |
| 2019/0335532 A1* | 10/2019 | Kim | ............... | H04W 72/02 |
| 2020/0205042 A1* | 6/2020 | Ryu | ............... | H04W 36/0027 |
| 2020/0337101 A1* | 10/2020 | Brooks | ............... | H04W 64/00 |
| 2020/0404553 A1* | 12/2020 | Lovlekar | ........... | H04W 36/0069 |
| 2022/0104098 A1* | 3/2022 | Takahashi | ............. | H04W 76/16 |

FOREIGN PATENT DOCUMENTS

| | | |
|---|---|---|
| CN | 107690162 A | 2/2018 |
| WO | 2012168332 A1 | 12/2012 |
| WO | 2018024212 A1 | 2/2018 |

OTHER PUBLICATIONS

International Search Report with English Translation for PCT/CN2019/086485 mailed Dec. 26, 2019.

* cited by examiner

Scenario 3A

Scenario 3

A terminal sends first information to a target secondary node, after determining that handover fails or a handover timer expires, wherein the first information includes handover failure information and/or MCG failure information; wherein the first information is forwarded by the target secondary node to a target master node for the target master node to determine a new handover procedure; or the first information is forwarded by the target secondary node to the target master node, and forwarded by the target master node to an original master node for the original master node to determine a new handover procedure

SWITCHING METHOD AND APPARATUS, AND COMMUNICATION DEVICE

CROSS-REFERENCE TO RELATED APPLICATION(S)

The present application is a continuation application of the International Application No. PCT/CN2019/086485, having an international filing date of May 10, 2019, the entire content of which is hereby incorporated by reference.

TECHNICAL FIELD

Embodiments of the present application relate to the field of mobile communication technologies, and more specifically, to a handover method, an apparatus, and a communication device.

BACKGROUND

At present, in an R16 Carrier Aggregation (CA)-Dual Connectivity (DC) enhancement project, it is supported that when a failure of a Master Cell Group (MCG) occurs, MCG failure information is sent through a link of a Secondary Cell Group (SCG) to a Master Node (MN). After the MN knows the failure information, for example, one handover procedure is triggered to dodge a problem of an MCG failure, thereby avoiding triggering of a Radio Resource Control (RRC) connection reestablishment.

However, for the handover procedure, a case that a handover fails will occur, and the RRC connection reestablishment will also be triggered after the handover fails, resulting in problems of service interruption and data loss.

SUMMARY

Embodiments of the present application provide a method for transmitting information, an apparatus, and a communication device.

A handover method provided by an embodiment of the present application includes: sending, by a terminal, first information to a target secondary node, after determining that a handover fails, or when a handover timer expires, wherein, the first information includes handover failure information and/or MCG failure information; wherein, the first information is forwarded by the target secondary node to a target master node for the target master node to determine a new handover procedure; or, the first information is forwarded by the target secondary node to the target master node, and forwarded by the target master node to an original master node for the original master node to determine a new handover procedure.

A handover apparatus provided by an embodiment of the present application includes: a sending unit, configured to send first information to a target secondary node, after it is determined that a handover fails, or when a handover timer expires, wherein the first information includes handover failure information and/or MCG failure information; wherein, the first information is forwarded by the target secondary node to a target master node for the target master node to determine a new handover procedure; or, the first information is forwarded by the target secondary node to the target master node, and forwarded by the target master node to an original master node for the original master node to determine a new handover procedure.

A communication device provided by an embodiment of the present application includes a processor and a memory. The memory is configured to store a computer program, and the processor is configured to call and run the computer program stored in the memory, to perform the method for transmitting information described above.

A chip provided by an embodiment of the present application is configured to implement the method for transmitting information described above.

Specifically, the chip includes: a processor, configured to call, from a memory, a computer program and run the computer program, so that a device having the chip installed therein performs the method for transmitting information described above.

A computer readable storage medium provided by an embodiment of the present application is configured to store a computer program, wherein the computer program causes a computer to perform the method for transmitting information described above.

A computer program product provided by an embodiment of the present application includes computer program instructions, wherein the program instructions cause a computer to perform the method for transmitting information described above.

A computer program provided by an embodiment of the present application, when being run on a computer, causes the computer to perform the method for transmitting information described above.

According to the above technical solution, when the handover fails in an MR-DC scenario, the terminal reports related failure information to the target secondary node, thereby triggering of an RRC connection reestablishment may be avoided, and further avoiding problems of service interruption and data loss.

BRIEF DESCRIPTION OF DRAWINGS

Accompanying drawings described herein are intended to provide further understanding of the present application, and form a part of the present application. Illustrative embodiments of the present application and descriptions thereof are intended to explain the present application, but not constitute an inappropriate limitation to the present application. In the drawings.

DETAILED DESCRIPTION

Technical solutions in embodiments of the present application will be described below with reference to the drawings in the embodiments of the present application. It is apparent that the embodiments described are just a part of embodiments of the present application, but not all of the embodiments. Based on the embodiments of the present application, all other embodiments achieved by a person of ordinary skill in the art without making inventive efforts all belong to the protection scope of the present application.

The technical solutions in the embodiments of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, LTE Time Division Duplex (TDD), a Universal Mobile Telecommunications System (UMTS), a Worldwide Interoperability for Microwave Access (WiMAX) communication system, or a 5G system, etc.

Figure 1:
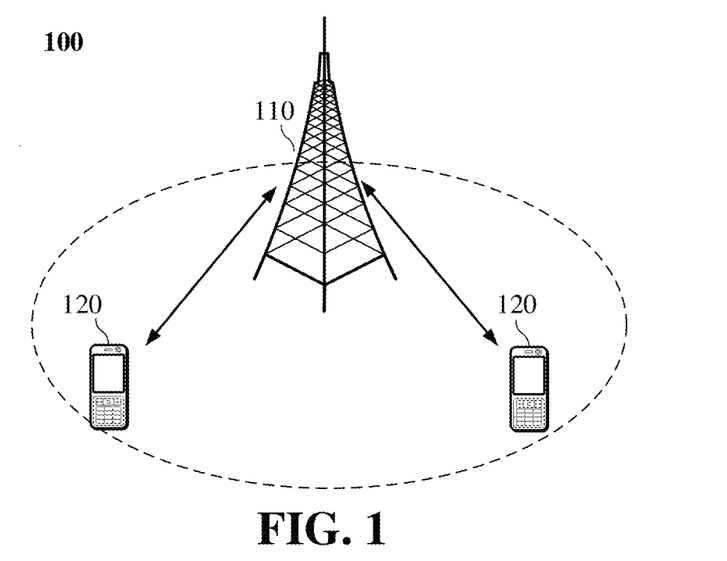
FIG. 1 is a schematic diagram of an architecture of a communication system in accordance with an embodiment of the present application.

Illustratively, a communication system 100 applied in an embodiment of the present application is shown in FIG. 1. The communication system 100 may include a network device 110. The network device 110 may be a device that communicates with terminals 120 (or referred to as communication terminals, or terminal devices). The network device 110 may provide communication coverage for a specific geographical area, and may communicate with a terminal located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAN), or the network device may be a mobile handover center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal 120 located within the coverage area of the network device 110. The "terminal" as used herein includes, but is not limited to, an apparatus configured to receive/send a communication signal via a wired circuit connection, for example, via a connection of Public Switched Telephone Networks (PSTN), a Digital Subscriber Line (DSL), a digital cable, or a direct cable; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal; and/or an Internet of Things (IoT) device. A terminal configured to communicate via a wireless interface may be referred to as "a wireless communication terminal", "a wireless terminal", or "a mobile terminal".

Examples of the mobile terminal include, but are not limited to, a satellite or cellular phone; a Personal Communications System (PCS) terminal which may combine a cellular radio phone with data processing, facsimile, and data communication abilities; a Personal Digital Assistant (PDA) that may include a radio phone, a pager, internet/intranet access, a Web browser, a memo pad, a calendar, and/or, a Global Positioning System (GPS) receiver; and a conventional laptop and/or palmtop receiver, or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a PDA, a handheld device with a wireless communication function, a computing device, or another processing device connected to a wireless modem, a vehicle-mounted device, a wearable device, a terminal in a 5G network, or a terminal in a future evolved PLMN, etc.

Optionally, Device to Device (D2D) communication may be performed between the terminals 120.

Optionally, the 5G system or the 5G network may also be referred to as a New Radio (NR) system or an NR network.

FIG. 1 illustrates exemplarily one network device and two terminals. Optionally, the communication system 100 may include multiple network devices, and another quantity of terminals may be included within the coverage area of each network device, which is not limited in the embodiments of the present application.

Optionally, the communication system 100 may also include another network entity, such as a network controller, a mobile management entity, etc., which is not limited in the embodiments of the present application.

It should be understood that a device with a communication function in a network/system in the embodiments of the present application may be referred to as a communication device. Taking the communication system 100 shown in FIG. 1 as an example, the communication device may include a network device 110 and terminals 120 which have communication functions, and the network device 110 and the terminals 120 may be the specific devices described above, which will not be repeated here again. The communication device may also include another device in the communication system 100, such as another network entity, such as a network controller, a mobile management entity, etc., which is not limited in the embodiments of the present application.

It should be understood that the terms "system" and "network" herein are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is an "or" relationship between the associated objects before and after "/".

With people's pursuit for speed, latency, high-speed mobility, and energy efficiency, and diversity and complexity of services in the future life, for this, $3^{rd}$ Generation Partnership Project (3GPP) International Standardization Organization began the research and the development of 5G. Main application scenarios of the 5G are: enhanced Mobile Broadband (eMBB), Ultra-Reliable Low-Latency Communications (URLLC), massive Machine-Type Communication (mMTC).

On one hand, the eMBB still aims at enabling users to obtain multimedia contents, services, and data, and demands thereof are growing very rapidly. On the other hand, because eMBBs may be deployed in different scenarios, such as indoor, an urban district, a rural area, or the like, and differences in their capabilities and demands are also relatively large, they cannot be generalized, and must be analyzed in detail in combination with specific deployment scenarios. Typical applications of the URLLC include: industrial automation, power automation, telemedicine operation (surgery), traffic safety guarantee, or the like. Typical characteristics of the mMTC include: a high connection density, a small data volume, a latency-insensitive service, a low cost and a long service life of modules, or the like.

In an early deployment of NR, a complete NR coverage is difficult to acquire, so typical network coverage is wide-area LTE coverage and an isolated island coverage mode of the NR. Moreover, a large amount of LTE is deployed below 6 GHz, and there are few spectrums below 6 GHz which may be used for the 5G. Therefore, spectrum applications above 6 GHz must be studied for the NR, while high frequent band coverage is limited, and signals fade fast. Meanwhile, a working mode of tight interworking between the LTE and the NR is proposed, in order to protect front-end investments by mobile operators in the LTE.

Figure 2:
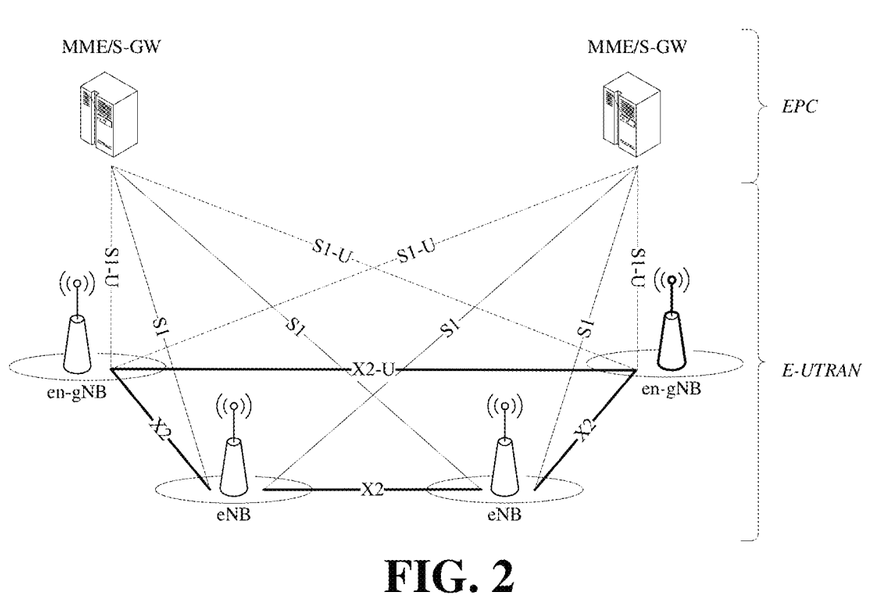
FIG. 2 is an overall networking architecture of EN-DC in accordance with an embodiment of the present application.

In order to be able to implement a network deployment of the 5G and commercial applications as soon as possible, a first 5G version, i.e., LTE-NR Dual Connectivity (EN-DC) is first completed in the 3GPP by the end of December, 2017. In the EN-DC, an LTE base station (eNB) serves as a Master Node (MN), and an NR base station (gNB or en-gNB) serves as a Secondary Node (SN). A network deployment and a networking architecture of the EN-DC are shown in FIG. 2, wherein E-UTRAN represents an access network part, and EPC represents a core network part. The access network part is composed of at least one eNB (two eNBs are illustrated in FIG. 2) and at least one en-gNB (two en-gNBs are illustrated in FIG. 2), wherein the eNB serves as the MN, the en-gNB serves as the SN, and both the MN and the SN are connected to the EPC.

Figure 3:
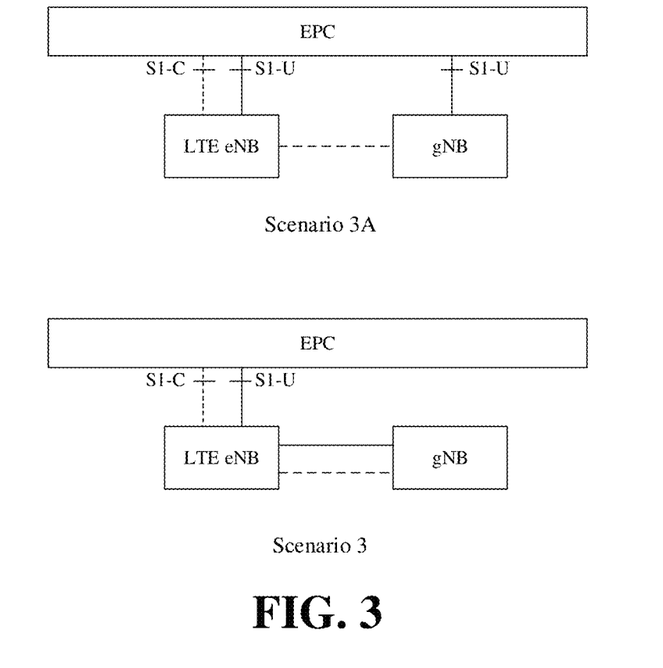
FIG. 3 is a schematic diagram of Scenario 3A and Scenario 3 of EN-DC in accordance with an embodiment of the present application.

Scenarios of the EN-DC include Scenario 3A and Scenario 3 shown in FIG. 3. Herein, in the Scenario 3A, an LTE eNB serves as the MN, and a gNB serves as the SN. There are a control plane interface (S1-C) and a user plane interface (S1-U) between the LTE eNB and the EPC, but there is only a user plane interface (S1-U) between the gNB and the EPC. Control plane signaling of the gNB needs to be forwarded to the EPC through the LTE eNB. In the Scenario 3, the LTE eNB serves as the MN, and the gNB serves as the SN. There are a control plane interface (S1-C) and a user plane interface (S1-U) between the LTE eNB and the EPC, and both the control plane signaling and a user plane message of the gNB need to be forwarded to the EPC through the LTE eNB.

Compared with LTE DC, a key technical point of the EN-DC mainly includes: a control plane, a user plane, security, a Radio Link Failure (RLF), system broadcast reception, or Radio Resource Management (RRM) coordination and UE capability coordination, etc., which will be described below respectively.

Control Plane

On the control plane, at both an MN side and an SN side, there are RRC entities, and RRC Protocol Data Units (PDUs) may be generated. However, there is only one RRC state machine at one same moment, and it is based on the MN side.

Signaling bearers in the LTE include Signaling Radio Bearer 0 (SRB0), SRB, SRB2, and based on this, SRB3 is further supported in the EN-DC. The SRB3 is used for transmitting RRC signaling between the SN and the UE, and generation of a signaling content of the signaling bearer does not need negotiation of resources and UE capabilities with the MN. Meanwhile, in order to improve reliability of SRB1 and the SRB2, split SRB1 and split SRB2 are supported in the EN-DC, that is, a copy of Packet Data Convergence Protocol (PDCP) PDU corresponding to an RRC message generated by the MN is repeatedly transmitted on the SN side, ensuring its high reliability.

User Plane

In the LTE DC, bearer types of the user plane include a Master Cell Group (MCG) bearer, a Secondary Cell Group (SCG) bearer, and an MCG split bearer. Based on this, in order to improve reliability of data transmission, a SCG split bearer is proposed in the EN-DC. The MCG split bearer and the SCG split bearer differ mainly in PDCP layer functions and PDCP layer keys.

Figure 4:
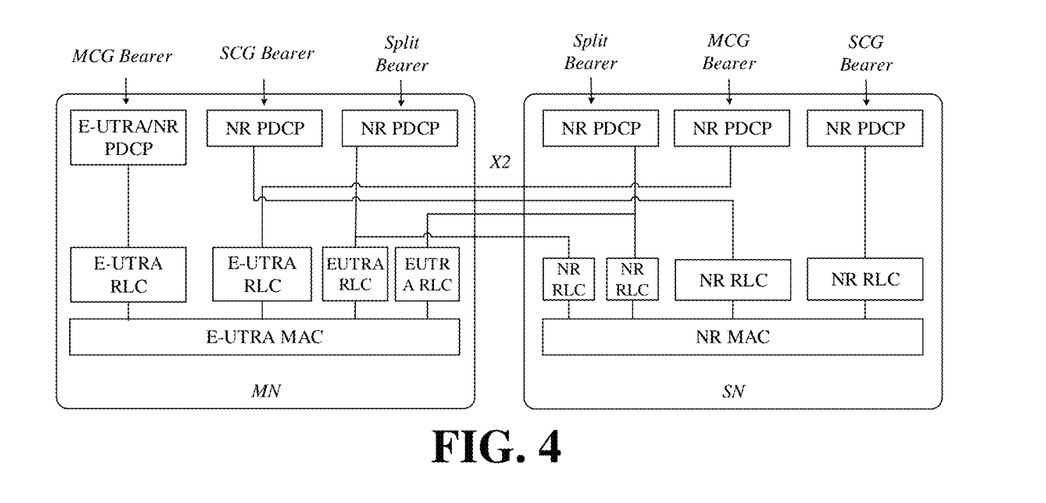
FIG. 4 is a schematic diagram of a user plane bearer type in accordance with an embodiment of the present application.

In order to minimize changes between the MCG split bearer and the SCG split bearer, reduce standardization, implementation, and test works, and minimize differentiation of market product characteristics, a concept of bearer harmonization is put forward, that is, the MCG split bearer and the SCG split bearer are unified into one bearer type, i.e., a Split bearer, that is, which split form is transparent to the UE, as shown in FIG. 4.

Transformation between different bearer types may be performed. In order to reduce impact brought by bearer transformation, a type specification of PDCP versions is configured for bearers.

TABLE 1

| | |
|---|---|
| Split bearer, SCG bearer | NR PDCP version. |
| MCG bearer | NR PDCP version or LTE PDCP version up to network configuration. |
| SRB3, split SRB 1/2 | NR PDCP version. |
| Non-split SRB1/2 | NR PDCP version or LTE PDCP version up to network configuration. |

Security

Figure 5:
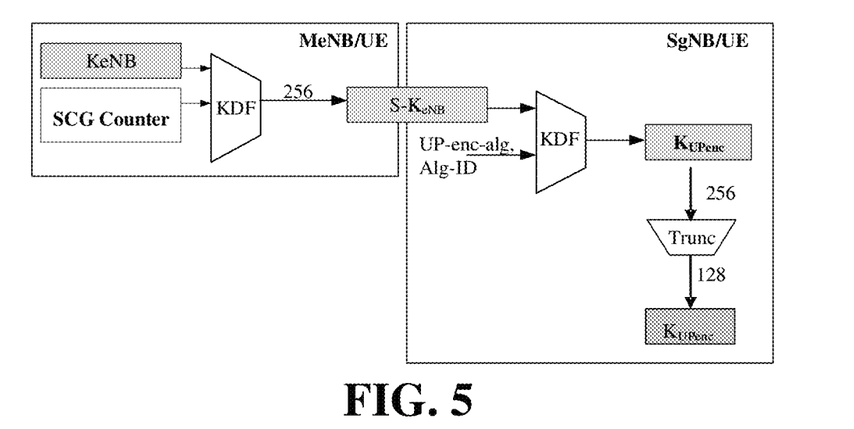
FIG. 5 is an architecture diagram of SN-side key derivation in accordance with an embodiment of the present application.

In the EN-DC, key derivation at the MN side is the same as a key derivation procedure of LTE Standalone (SA) networking. A key and a parameter input for the SN side are shown in FIG. 5. In the EN-DC, a network side configures one key of a KeNB or an S-KeNB for each bearer to this bearer.

With regard to reporting of the UE for NR security algorithm supporting capabilities, in order to reduce impact on the EPC, the network side supports judging of NR algorithm capability support, through an LTE security capability algorithm, for example, NR algorithms (nea0/1/2/3 and nia0/1/2/3) correspond to LTE algorithms (EEA 0/1/2/3 and EIA 0/1/2/3).

Wireless Link Monitoring

In the EN-DC, if the RLF occurs at an MCG side, the UE is triggered to initiate an RRC connection reestablishment procedure. If the RLF occurs at an SCG side, the UE suspends all SCG side bearers and SCG side transmissions, and reports SCGFailureInformation to the MN side.

During an SCG failure, the UE maintains measurement configurations from the MN and SN sides, and continues to perform corresponding measurements, if possible.

System Broadcast Information Reception

An NR SN does not need to broadcast system broadcast information, except System Frame Number (SFN) timing information. System information is provided to the UE by LTE eNB using special signaling. The UE needs to acquire wireless frame timing and SFN information of the SCG at least from an NR Primary and Secondary Cell (PSCell).

A System Information (SI) change of an NR SCG may be configured to the UE through dedicated signaling, or an LTE SCG SRB or an NR MCG SRB.

NR Scell SI is changed. The network side first releases and then adds a related NR Scell, while uses one same RRC connection reconfiguration message. Moreover, this procedure may be completed by an MCG SRB or an SCG SRB.

In a later stage of R15, other DC modes, i.e., NE-DC, 5GC-EN-DC, and NR DC, will be supported. For the EN-DC, a core network, to which the access network is connected, is a 4G core network (EPC), while for the other DC modes, a connected core network is a 5G core network (5GC). In an MR-DC mode, for an EN-DC architecture, the LTE eNB is the MN, an NR gNB is the SN, and both the MN and the SN are connected to the EPC. For an NE-DC architecture, the NR gNB is the MN, an eLTE eNB is the SN, and both the MN and the SN are connected to a next generation core network. Of course, the MN and the SN may be of a same type, and are both of NR gNBs, wherein these two NR gNBs are both connected to the next generation core network.

In MR-DC, the UE configured with the MR-DC may be to perform handover, and the SN may or may not change during the handover procedure. MR-DC handover may be to fail, and the RRC connection reestablishment will be triggered after the failure. At present, in an R16 CA-DC enhancement project, it is supported that when a failure of the MCG occurs, MCG failure information is sent through a link of the SCG to the network side (i.e., the MN). After the MN knows the failure information, for example, one handover procedure is triggered to dodge a problem of MCG failure, thereby avoiding triggering of the RRC connection reestablishment. A reason is that the RRC connection reestablishment will bring problems of service interruption and data loss. However, for a handover failure, because after receiving a handover command, the UE will release a context of the UE at an original MN side, and establish a context of a target node of handover, and a change of the SN may occur, the MCG failure information cannot be reported to the network side through the original SN node. To this end, the following technical solution of the embodiment of the present application is proposed.

Figure 6:
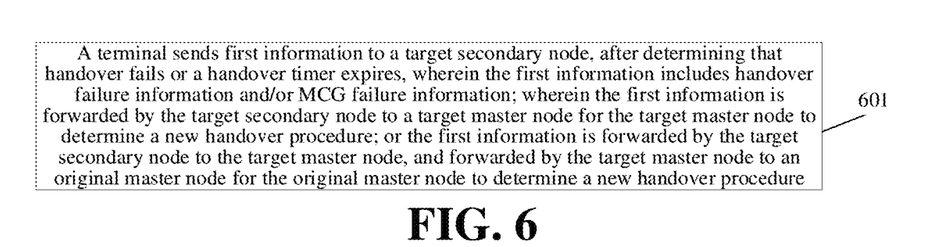
FIG. 6 is a first schematic flow of a handover method in accordance with an embodiment of the present application.

FIG. 6 is a first schematic flow of a handover method in accordance with an embodiment of the present application. As shown in FIG. 6, the handover method includes the following acts.

In act 601, a terminal sends first information to a target secondary node, after determining that handover fails, or when a handover timer expires, wherein the first information includes handover failure information and/or MCG failure information; wherein the first information is forwarded by the target secondary node to a target master node for the target master node to determine a new handover procedure; or the first information is forwarded by the target secondary node to the target master node, and forwarded by the target master node to an original master node for the original master node to determine a new handover procedure.

In the embodiment of the present application, the terminal may be any device that can communicate with a network, such as a mobile phone, a tablet computer, a notebook, a vehicle-mounted terminal, etc.

The embodiment of the present application is applied to an MR-DC scenario, specifically, 1) the original master node (S-MN) determines to initiate a handover procedure, initiating a handover request to the target master node (T-MN). 2) The T-MN determines whether the handover request is received, and determines adding information of the target secondary node (T-SN) according to a measurement result notified by the S-MN, and initiates an SN adding request to the T-SN. 3) The T-SN receives the SN adding request, and replies to the T-MN with an SN adding request response. 4) The T-MN replies to the S-MN with a handover request response message. 5) The S-MN sends a handover command to the terminal. Then, the following acts of the embodiment of the present application are performed.

Specifically, 1) the terminal initiates a first random access procedure to the target master node, and if the first random access procedure is unsuccessful, it is determined that the handover fails. 2) The terminal initiates a second random access procedure to the target secondary node, and the second random access procedure is successful.

Through the above acts 1) and 2), it may be determined that the terminal is successful in accessing to the target secondary node, and fails to access to the target master node, and the terminal may communicate with the target secondary node.

In an embodiment of the present application, after determining that the handover fails, or when the handover timer expires, the terminal sends the first information to the target secondary node, wherein the first information includes the handover failure information and/or the MCG failure information.

In an embodiment of the present application, the terminal may send the first information to the target secondary node in any of the following modes.

In a first mode, the terminal sends the first information to the target secondary node through split SRB1.

Further, the first information is carried in first RRC signaling, wherein encryption and integrity protection of the first RRC signaling is performed through a key and an algorithm of SRB1 at the target master node side.

In a second Mode, the terminal sends the first information to the target secondary node through SRB3.

Further, the first information is carried in second RRC signaling, wherein encryption and integrity protection of the second RRC signaling is performed through a key and an algorithm of SRB3 at the target secondary node side.

In an embodiment of the present application, after the target secondary node receives the first information, there are the following two kinds of forwarding paths of the first information.

In a first path, the first information is forwarded by the target secondary node to the target master node, and forwarded by the target master node to the original master node for the original master node to determine the new handover procedure.

In a second path, the first information is forwarded by the target secondary node to the target master node for the target master node to determine the new handover procedure.

For the second path, the target master node determining the new handover procedure includes the following acts.

1) The target master node determines a target node of handover, and sends a General Packet Radio Service (GPRS) Tunneling Protocol (GTP) tunnel number allocated by a core network to be used in a path switch procedure to the target node.

2) The target master node receives a handover command, and forwards the handover command to the target secondary node.
3) The target secondary node sends the handover command to the terminal, to trigger the terminal to access the target node.

Here, the target secondary node sends the handover command to the terminal through the split SRB1. Alternatively, the target secondary node sends the handover command to the terminal through the SRB3.

4) The target node initiates the path switch procedure to the core network, according to the GTP tunnel number.

In the above solution, in an implementation, the target node and the target secondary node are the same node, and because the terminal has already initiated the second random access procedure to the target secondary node, the random access procedure of the terminal to the target secondary node may be omitted. Alternatively, in another implementation, the target node and the target secondary node are different nodes, and in such a case, the terminal needs to initiate a third random access procedure to the target node.

In an embodiment of the present application, the first information includes at least one of the following: a failure type; cell identity information of a Primary Cell (PCell) at an original master node side; cell identity information of a Primary Secondary Cell (PSCell) at an original secondary node side; cell identity information of the PCell at the target master node side; cell identity information of the PSCell at the target secondary node side; a cell information quality of the PCell at the original master node side; a cell information quality of the PSCell at the original secondary node side; a cell information quality of the PCell at the target master node side; or a cell information quality of the PSCell at the target secondary node side.

Here, the failure type is a handover failure type, for example.

Here, the cell information quality includes at least one of the following: RSRP, RSRQ, SINR, or a beam measurement result.

Figure 7:
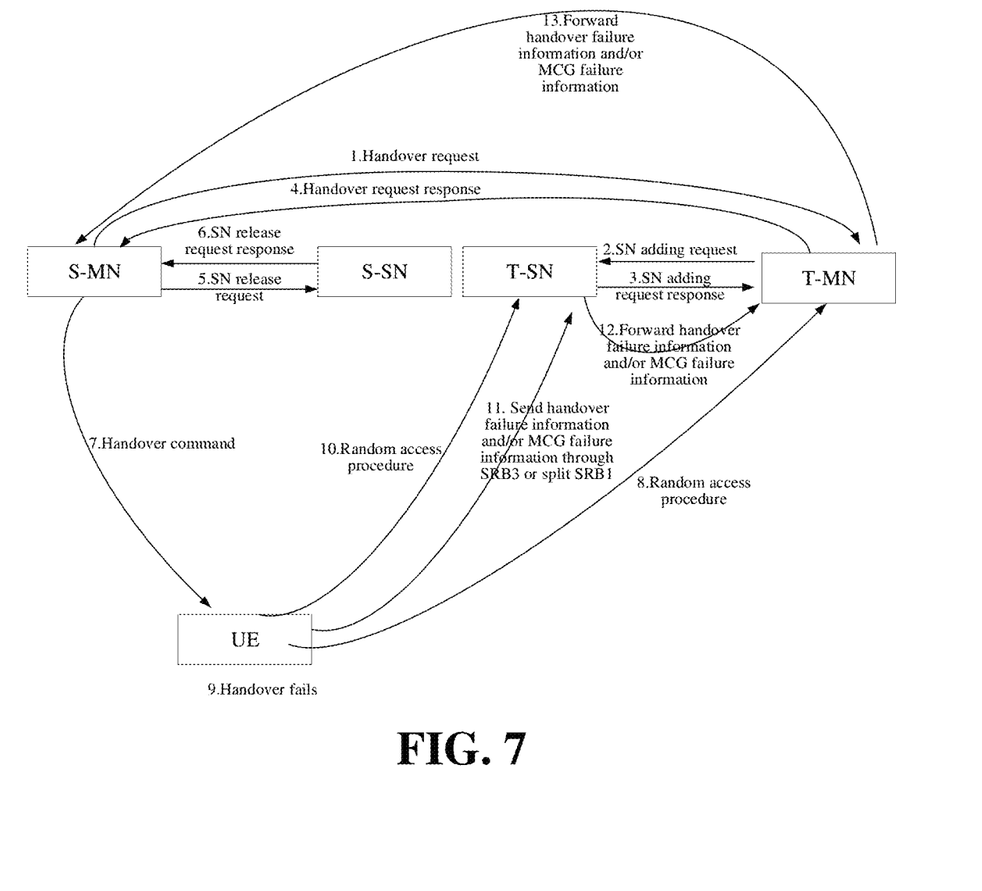
FIG. 7 is a second schematic flow of a handover method in accordance with an embodiment of the present application.

FIG. 7 is a second schematic flow of a handover method in accordance with an embodiment of the present application. As shown in FIG. 7, the handover method includes the following acts.

1. An S-MN determines to initiate a handover procedure, to initiate a handover request to a T-MN.
2. The T-MN determines whether the handover request is received, and determines adding information of a T-SN according to a measurement result notified by the S-MN, and initiates an SN adding request to the T-SN.
3. The SN receives the SN adding request, and replies to the T-MN with an SN adding request response.
4. The T-MN replies to the S-MN with a handover request response.
5. The S-MN initiates an SN release request to the S-SN.
6. The S-SN releases a resource configuration, and replies to the S-MN with an SN release response.
7. The S-MN sends a handover command to a UE.
8. The UE establishes resource configurations of the T-MN and the T-SN according to the resource configuration, and initiates a random access procedure to the T-MN.
9. If a handover timer expires, the handover fails.
10. The UE initiates the random access procedure to the T-SN, and the initiation is successful.
11. The UE sends handover failure information or MCG failure information to the target SN.
1) The UE sends the handover failure information or the MCG failure information through split SRB1 established by the UE at the T-MN and the T-SN, and at this time, encryption and integrity protection of RRC signaling where the failure information is located is performed through a key and an algorithm of SRB1 of the T-MN. Or, it is as follows.
2) The UE sends the handover failure information or the MCG failure information through SRB3 established by the UE at the T-SN, and at this time, encryption and integrity protection of the RRC signaling where the failure information is located is performed through a key and an algorithm of SRB3 of the T-SN.
12. The T-SN forwards the handover failure information or the MCG failure information to the T-MN.
13. The T-SN forwards the handover failure information or the MCG failure information to the S-MN. The original SN determines a new handover procedure, according to the failure information.

Figure 8:
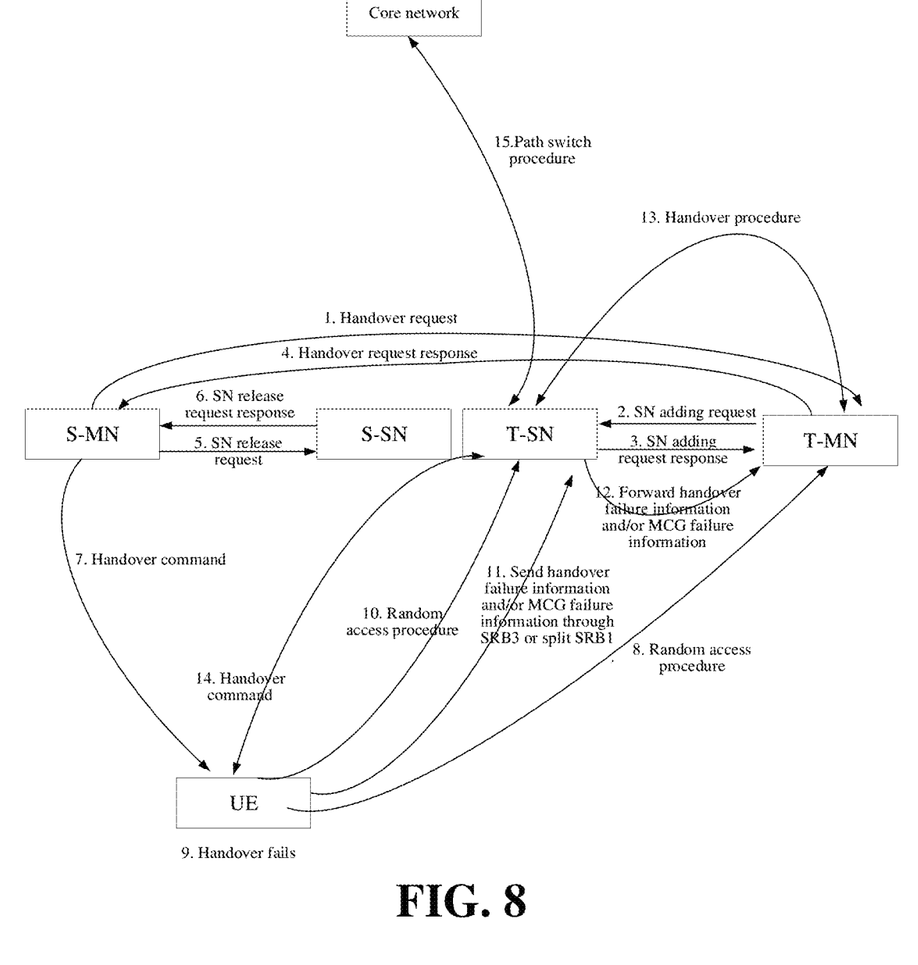
FIG. 8 is a third schematic flow of a handover method in accordance with an embodiment of the present application.

FIG. 8 is a third schematic flow of a handover method in accordance with an embodiment of the present application. As shown in FIG. 8, the handover method includes the following acts.

1. An S-MN determines to initiate a handover procedure, to initiate a handover request to a T-MN.
2. The T-MN determines whether the handover request is received, and determines adding information of a T-SN according to a measurement result notified by the S-MN, and initiates an SN adding request to the T-SN.
3. The SN receives the SN adding request, and replies to the T-MN with an SN adding request response.
4. The T-MN replies to the S-MN with a handover request response.
5. The S-MN sends an SN release request to an S-SN.
6. The S-SN releases a resource configuration, and replies to the S-MN with an SN release response.
7. The S-MN sends a handover command to a UE.
8. The UE establishes resource configurations of the T-MN and the T-SN according to the resource configuration, and initiates a random access procedure to the T-MN.
9. If a handover timer expires, the handover fails.
10. The UE initiates the random access procedure to the T-SN, and the initiation is successful.
11. The UE sends handover failure information or MCG failure information to the target SN.
1) The UE sends the handover failure information or the MCG failure information through split SRB1 established by the UE at the T-MN and the T-SN, and at this point, encryption and integrity protection of RRC signaling where the failure information is located is performed through a key and an algorithm of SRB1 of the T-MN. Or, it is as follows.
2) The UE sends the handover failure information or the MCG failure information through SRB3 established by the UE at the T-SN, and at this time, encryption and integrity protection of the RRC signaling where the failure information is located is performed through a key and an algorithm of SRB3 of the T-SN.
12. The T-SN forwards the handover failure information or the MCG failure information to the T-MN.
13. The T-MN performs the handover procedure (i.e., determines a new handover procedure).

For example, the target node is the T-SN, but of course it may be another node instead of the T-SN. The T-MN informs a new target node of the handover, of a GTP tunnel number allocated by a core network in a GTP tunnel in a path switch procedure. In one example, the new target node is, for example, the T-SN.

14. The T-SN sends the handover command to the UE through the split SRB1 or the SRB3. The UE initiates the random access procedure to the new target node. If the new target node is the T-SN, the random access procedure may be omitted, and a handover complete response message is sent directly.
15. The target node of handover (e.g., the T-SN) initiates the path switch procedure to the core network.

Figure 9:
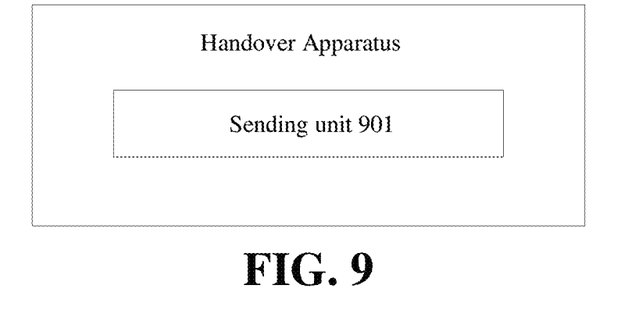
FIG. 9 is a schematic structural composition diagram of a handover apparatus in accordance with an embodiment of the present application.

FIG. 9 is a schematic structural composition diagram of a handover apparatus in accordance with an embodiment of the present application. As shown in FIG. 9, the handover apparatus includes: a sending unit 901, configured to send first information to a target secondary node, after it is determined that handover fails, or when a handover timer expires, wherein the first information includes handover failure information and/or MCG failure information; wherein, the first information is forwarded by the target secondary node to a target master node for the target master node to determine a new handover procedure; or the first information is forwarded by the target secondary node to the target master node, and forwarded by the target master node to an original master node for the original master node to determine a new handover procedure.

In an implementation, the apparatus further includes: a first access unit, configured to initiate a first random access procedure to the target master node, and determine that the handover fails if the first random access procedure is unsuccessful.

In an implementation, the apparatus further includes: a second access unit, configured to initiate a second random access procedure to the target secondary node, and the second random access procedure is successful.

In an implementation, the sending unit is configured to send the first information to the target secondary node through split SRB1.

In an implementation, the first information is carried in first RRC signaling, wherein encryption and integrity protection of the first RRC signaling is performed through a key and an algorithm of SRB1 at the target master node side.

In an implementation, the sending unit is configured to send the first information to the target secondary node through SRB3.

In an implementation, the first information is carried in second RRC signaling, wherein encryption and integrity protection of the second RRC signaling is performed through a key and an algorithm of SRB3 at the target secondary node side.

In an implementation, the target master node determining the new handover procedure includes: the target master node determining a target node of handover, and sending a GTP tunnel number allocated by a core network to be used in a path switch procedure to the target node; the target master node receiving a handover command, and forwarding the handover command to the target secondary node; the target secondary node sending the handover command to the terminal, to trigger the terminal to access the target node; and the target node initiating the path switch procedure to the core network, according to the GTP tunnel number.

In an implementation, the target secondary node sending the handover command to the terminal includes: the target secondary node sending the handover command to the terminal through split SRB1.

In an implementation, the target secondary node sending the handover command to the terminal includes: the target secondary node sending the handover command to the terminal through SRB3.

In an implementation, the target node and the target secondary node are the same node; or, the target node and the target secondary node are different nodes.

In an implementation, in a case that the target node and the target secondary node are the different nodes, the apparatus further includes: a third access unit, configured to initiate a third random access procedure to the target node.

In an implementation, the first information includes at least one of the following: failure type; cell identity information of a PCell at an original master node side; cell identity information of a PSCell at an original secondary node side; cell identity information of the PCell at a target master node side; cell identity information of the PSCell at a target secondary node side; a cell information quality of the PCell at the original master node side; a cell information quality of the PSCell at the original secondary node side; a cell information quality of the PCell at the target master node side; or a cell information quality of the PSCell at the target secondary node side.

Those skilled in the art should understand that the related description of the apparatus for transmitting information in accordance with the embodiment of the present application may be understood with reference to the related description of the method for transmitting information in accordance with the embodiment of the present application.

Figure 10:
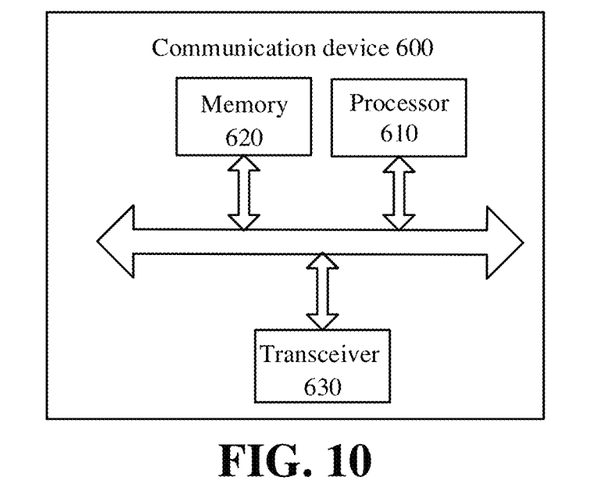
FIG. 10 is a schematic structural diagram of a communication device in accordance with an embodiment of the present application.

FIG. 10 is a schematic structural diagram of a communication device 600 in accordance with an embodiment of the present application. The communication device may be a terminal or a network device (e.g., a base station). The communication device 600 shown in FIG. 10 includes a processor 610, wherein the processor 610 may call, from a memory, a computer program and run the computer program, to implement the method in the embodiments of the present application.

Optionally, as shown in FIG. 10, the communication device 600 may further include a memory 620. Herein, the processor 610 may call, from the memory 620, a computer program and run the computer program, to implement the methods in the embodiments of the present application.

Herein, the memory 620 may be one separate device independent of the processor 610, or may be integrated in the processor 610.

Optionally, as shown in FIG. 10, the communication device 600 may further include a transceiver 630. The processor 610 may control the transceiver 630 to communicate with another device. Specifically, information or data may be sent to another device, or information or data sent by another device may be received.

Herein, the transceiver 630 may include a transmitter and a receiver. The transceiver 630 may also further include antennas, wherein a quantity of the antennas may be one or more.

Optionally, the communication device 600 may be specifically the network device in accordance with the embodiment of the present application, and the communication device 600 may implement the corresponding processes implemented by the network device in various methods in the embodiments of the present application, which will not be repeated here again for brevity.

Optionally, the communication device 600 may be specifically the mobile terminal/terminal in accordance with the embodiment of the present application, and the communication device 600 may implement the corresponding processes implemented by the mobile terminal/terminal in various methods in the embodiments of the present application, which will not be repeated here again for brevity.

Figure 11:
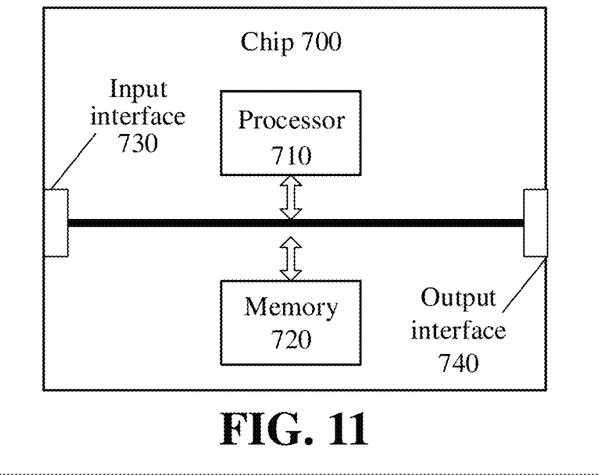
FIG. 11 is a schematic structural diagram of a chip in accordance with an embodiment of the present application.

FIG. 11 is a schematic structural diagram of a chip in accordance with an embodiment of the present application. A chip 700 shown in FIG. 11 includes a processor 710, wherein the processor 710 may call, from a memory, a computer program and run the computer program, to implement the methods in the embodiments of the present application.

Optionally, as shown in FIG. 11, the chip 700 may further include the memory 720. Herein, the processor 710 may call, from the memory 620, a computer program and run the computer program, to implement the methods in the embodiments of the present application.

Herein, the memory 720 may be one separate device independent of the processor 710, or may be integrated in the processor 710.

Optionally, the chip 700 may further include an input interface 730. Herein, the processor 710 may control the input interface 730 to communicate with another device or chip. Specifically, information or data sent by another device or chip may be acquired.

Optionally, the chip 700 may further include an output interface 740. Herein, the processor 710 may control the output interface 740 to communicate with another device or chip. Specifically, information or data may be outputted to another device or chip.

Optionally, the chip may be applied to the network device in the embodiments of the present application, and the chip may implement the corresponding processes implemented by the network device in various methods in the embodiments of the present application, which will not be repeated here again for brevity.

Optionally, the chip may be applied to the mobile terminal/terminal in the embodiments of the present application, and the chip may implement the corresponding processes implemented by the mobile terminal/terminal in various methods in the embodiments of the present application, which will not be repeated here again for brevity.

It should be understood that the chip mentioned in the embodiments of the present application may also be referred to as a system-level chip, a system chip, a chip system, or a system chip-on-chip, etc.

Figure 12:
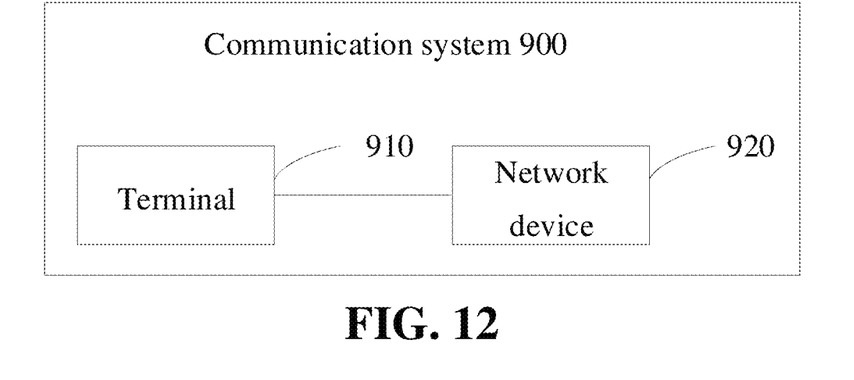
FIG. 12 is a schematic block diagram of a communication system in accordance with an embodiment of the present application.

FIG. 12 is a schematic block diagram of a communication system 900 in accordance with an embodiment of the present application. As shown in FIG. 12, the communication system 900 includes a terminal 910 and a network device 920.

Herein, the terminal 910 may be configured to implement the corresponding functions implemented by the terminal in the methods described above, and the network device 920 may be configured to implement the corresponding functions implemented by the network device in the methods described above, which will not be repeated here again for brevity.

It should be understood that the processor in the embodiments of the present application may be an integrated circuit chip, having a signal processing capability. In an implementation process, each of the acts of the foregoing method embodiments may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. Various methods, acts, and logical block diagrams disclosed in the embodiments of the present application may be implemented or performed. The general purpose processor may be a microprocessor, or the processor may also be any conventional processor, or the like. The acts of the methods disclosed in the embodiments of the present application may be directly embodied to be executed and completed by a hardware decoding processor, or may be performed and completed by a combination of hardware and software modules in the decoding processor. The software modules may be located in a storage medium which is mature in the art, such as a random access memory, a flash memory, a read-only memory, a programmable read-only memory or an electrically erasable programmable memory, a register, or the like. The storage medium is located in the memory, and the processor reads information in the memory, and completes the acts of the foregoing methods in combination with hardware thereof.

It may be understood that the memory in the embodiments of the present application may be a volatile memory or a non-volatile memory, or may include both a volatile memory and a non-volatile memory. Herein, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through an exemplary but non-restrictive description, many forms of RAMs may be available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink SDRAM (SLDRAM), or a Direct Rambus RAM (DR RAM). It should be noted that the memory in the systems and the methods described herein is intended to include, but not be limited to, these and any other suitable types of memories.

It should be understood that the foregoing memory is an exemplary but non-restrictive description. For example, the memory in the embodiments of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), or a Direct Rambus RAM (DR RAM), etc. That is, the memory in the embodiments of the present application is intended to include, but not be limited to, these and any other suitable types of memories.

An embodiment of the present application further provides a computer readable storage medium, configured to store a computer program.

Optionally, the computer readable storage medium may be applied to the network device in the embodiments of the present application, and the computer program causes a computer to perform the corresponding processes implemented by the network device in various methods in accordance with the embodiments of the present application, which will not be repeated here again for brevity.

Optionally, the computer readable storage medium may be applied to the mobile terminal/terminal in the embodiments of the present application, and the computer program causes the computer to perform the corresponding processes implemented by the mobile terminal/terminal in various methods in accordance with the embodiments of the present application, which will not be repeated here again for brevity.

An embodiment of the present application further provides a computer program product, including computer program instructions.

Optionally, the computer program product may be applied to the network device in the embodiments of the present application, and the computer program instructions cause the computer to perform the corresponding processes implemented by the network device in various methods in accordance with the embodiments of the present application, which will not be repeated here again for brevity.

Optionally, the computer program product may be applied to the mobile terminal/terminal in the embodiments of the present application, and the computer program instructions cause the computer to perform the corresponding processes implemented by the mobile terminal/terminal in various methods in accordance with the embodiments of the present application, which will not be repeated here again for brevity.

An embodiment of the present application further provides a computer program.

Optionally, the computer program may be applied to the network device in the embodiments of the present application. The computer program, when being run on a computer, causes the computer to perform the corresponding processes implemented by the network device in various methods in accordance with the embodiments of the present application, which will not be repeated here again for brevity.

Optionally, the computer program may be applied to the mobile terminal/terminal in the embodiments of the present application. The computer program, when being run on a computer, causes the computer to perform the corresponding processes implemented by the mobile terminal/terminal in various methods in accordance with the embodiments of the present application, which will not be repeated here again for brevity.

A person of ordinary skill in the art may recognize that the units and algorithm acts in various examples described in combination with the embodiments disclosed herein, can be implemented in electronic hardware, or a combination of computer software and the electronic hardware. Whether these functions are implemented in hardware or software depends on a specific application and design constraint condition of the technical solution. Skilled artisans may use different methods to implement the described functions for each particular application, but such an implementation should not be considered to be beyond the scope of the present application.

Those skilled in the art may clearly understand that for the sake of convenience and conciseness of description, specific working processes of the systems, the apparatuses, and the units described above may refer to the corresponding processes in the above method embodiments, which will not be repeated here again.

In several embodiments provided by the present application, it should be understood that the disclosed systems, apparatuses, and methods may be implemented in another mode. For example, the apparatus embodiments described above are only illustrative, for example, the division of the units is only a logical function division, and there may be another division mode in an actual implementation. For example, multiple units or components may be combined, or may be integrated into another system, or some features may be ignored, or not executed. In addition, the shown or discussed coupling or direct coupling or communication connection between each other may be indirect coupling or a communication connection through some interfaces, apparatuses, or units, or may be in electrical, mechanical, or another form.

The unit described as a separate component may or may not be physically separated, and the component shown as a unit may or may not be a physical unit, i.e., it may be located in one place, or may be distributed across multiple network units. Part or all of the units thereof may be selected according to an actual need to achieve the purpose of the solution the present embodiment.

In addition, various functional units in various embodiments of the present application may be integrated into one processing unit, or may exist physically separately, or two or more than two units may be integrated into one unit.

The function, if implemented in a form of a software functional unit, and sold or used as an independent product, may be stored in one computer-readable storage medium. Based on such understanding, the technical solution of the present application, in essence, or the part contributing to the prior art, or part of the technical solution, may be embodied in a form of a software product, which is stored in one storage medium, and includes several instructions for causing one computer device (which may be a personal computer, a server, or a network device, etc.) to perform all or part of the acts of the methods described in the various embodiments of the present application. And the aforementioned storage medium includes: various media, such as a U disk, a mobile hard disk, a Read-Only Memory (ROM), a Random Access Memory (RAM), a magnetic disk, or an optical disk, etc., which may store program codes.

What are described above are merely specific implementations of the present application, but the protection scope of the present application is not limited thereto. Any variation or substitution that may easily occur to a person skilled in the art within the technical scope disclosed by the present application shall be included within the protection scope of the present application. Therefore, the protection scope of the present application shall be subject to the protection scope of the claims.

What is claimed is:

1. A handover method, comprising:
sending, by a terminal, first information to a target secondary node, after determining that handover fails or when a handover timer expires, wherein the first information comprises handover failure information and/or master cell group (MCG) failure information;
wherein the first information is forwarded by the target secondary node to a target master node for the target master node to determine a new handover procedure;
wherein before the terminal determines that handover fails or the handover timer expires, the method further comprises: receiving, by the terminal, a first handover command from an original master node;
wherein determining, by the target master node, the new handover procedure comprises:
determining, by the target master node, a target node of handover, and sending a general packet radio service (GPRS) tunneling protocol (GTP) tunnel number allocated by a core network to be used in a path switch procedure to the target node;
receiving, by the target master node, a second handover command, and forwarding the second handover command to the target secondary node;
sending, by the target secondary node, the second handover command to the terminal, to trigger the terminal to access the target node; and initiating, by the target node, the path switch procedure to the core network, according to the GTP tunnel number.

2. The method of claim 1, wherein determining, by the terminal, that the handover fails comprises:
initiating, by the terminal, a first random access procedure to the target master node, and determining that the handover fails if the first random access procedure is unsuccessful.

3. The method of claim 1, wherein before sending, by the terminal, the first information to the target secondary node, the method further comprises:
initiating, by the terminal, a second random access procedure to the target secondary node, and the second random access procedure being successful.

4. The method of claim 1, wherein sending, by the terminal, the first information to the target secondary node comprises:
sending, by the terminal, the first information to the target secondary node through a split signaling radio bearer 1 (SRB1);
wherein the first information is carried in first RRC signaling, wherein encryption and integrity protection of the first RRC signaling is performed through a key and an algorithm of the SRB1 at the target master node side.

5. The method of claim 1, wherein sending, by the terminal, the first information to the target secondary node comprises:
sending, by the terminal, the first information to the target secondary node through a signaling radio bearer 3 (SRB3);
wherein the first information is carried in second RRC signaling, wherein encryption and integrity protection of the second RRC signaling is performed through a key and an algorithm of the SRB3 at the target secondary node side.

6. The method of claim 1, wherein,
sending, by the target secondary node, the second handover command to the terminal comprises:
sending, by the target secondary node, the second handover command to the terminal through a split signaling radio bearer 1 (SRB1); or
sending, by the target secondary node, the second handover command to the terminal through a signaling radio bearer 3 (SRB3).

7. The method of claim 6, wherein,
the target node and the target secondary node are a same node; or
the target node and the target secondary node are different nodes.

8. The method of claim 7, wherein in a case that the target node and the target secondary node are different nodes, the method further comprises:
initiating, by the terminal, a third random access procedure to the target node.

9. The method of claim 1, wherein the first information comprises at least one of the following:
a failure type;
cell identity information of a primary cell (PCell) at an original master node side;
cell identity information of a primary secondary cell (PSCell) at an original secondary node side;
cell identity information of a PCell at the target master node side;
cell identity information of a PSCell at the target secondary node side;
a cell information quality of the PCell at the original master node side;
a cell information quality of the PSCell at the original secondary node side;
a cell information quality of the PCell at the target master node side; or
a cell information quality of the PSCell at the target secondary node side.

10. A handover apparatus, comprising:
a transmitter, configured to send first information to a target secondary node, after it is determined that handover fails or when a handover timer expires, wherein the first information comprises handover failure information and/or master cell group (MCG) failure information;
wherein the first information is forwarded by the target secondary node to a target master node for the target master node to determine a new handover procedure;
wherein the handover apparatus further comprises: a receiver, configured to receive a first handover command from an original master node before the handover apparatus determines that handover fails or the handover timer expires;
wherein determining, by the target master node, the new handover procedure comprises:
determining, by the target master node, a target node of handover, and sending a general packet radio service (GPRS) tunneling protocol (GTP) tunnel number allocated by a core network to be used in a path switch procedure to the target node;
receiving, by the target master node, a second handover command, and forwarding the second handover command to the target secondary node;
sending, by the target secondary node, the second handover command to a terminal, to trigger the terminal to access the target node; and
initiating, by the target node, the path switch procedure to the core network, according to the GTP tunnel number.

11. The apparatus of claim 10, further comprising:
a processor, configured to initiate a first random access procedure to the target master node, and determine that the handover fails if the first random access procedure is unsuccessful.

12. The apparatus of claim 10, further comprising:
a processor, configured to initiate a second random access procedure to the target secondary node, wherein the second random access procedure is successful.

13. The apparatus of claim 10, wherein the transmitter is configured to send the first information to the target secondary node through a split signaling radio bearer 1 (SRB1);
wherein the first information is carried in first RRC signaling, wherein encryption and integrity protection of the first RRC signaling is performed through a key and an algorithm of the SRB1 at the target master node side.

14. The apparatus of claim 10, wherein the transmitter is configured to send the first information to the target secondary node through an signaling radio bearer 3 (SRB3);
wherein the first information is carried in second RRC signaling, wherein encryption and integrity protection of the second RRC signaling is performed through a key and an algorithm of the SRB3 at the target secondary node side.

15. The apparatus of claim 10, wherein,
sending, by the target secondary node, the second handover command to the terminal comprises:

sending, by the target secondary node, the second handover command to the terminal through a split signaling radio bearer 1 (SRB1); or sending, by the target secondary node, the second handover command to the terminal through a signaling radio bearer 3 (SRB3).

16. The apparatus of claim 15, wherein, the target node and the target secondary node are a same node; or, the target node and the target secondary node are different nodes.

17. The apparatus of claim 16, wherein in a case that the target node and the target secondary node are different nodes, the apparatus further comprises:

a processor, configured to initiate a third random access procedure to the target node.

18. The apparatus of claim 10, wherein the first information comprises at least one of the following:

a failure type;

cell identity information of a primary cell (PCell) at an original master node side;

cell identity information of a primary secondary cell (PSCell) at an original secondary node side;

cell identity information of a PCell at a target master node side;

cell identity information of a PSCell at a target secondary node side;

a cell information quality of the PCell at the original master node side;

a cell information quality of the PSCell at the original secondary node side;

a cell information quality of the PCell at the target master node side; or a cell information quality of the PSCell at the target secondary node side.

19. A communication device, comprising: a processor and a memory, wherein the memory is configured to store a computer program, and the processor is configured to call and run the computer program stored in the memory, to perform the method of claim 1.

20. A non-transitory computer readable storage medium, configured to store a computer program, which causes a computer to perform the method of claim 1.

* * * * *